(12) United States Patent
Dohring et al.

(10) Patent No.: US 10,113,269 B2
(45) Date of Patent: Oct. 30, 2018

(54) DISPERSION FOR PRODUCING ABRASION-RESISTANT SURFACES

(71) Applicant: Kronoplus Technical AG, Niederteufen (CH)

(72) Inventors: Dieter Dohring, Niederteufen (CH); Oliver Hartl, Hard (AT)

(73) Assignee: Kronoplus Technical AG, Niederteufen (CH)

( * ) Notice: Subject to any disclaimer, the term of this patent is extended or adjusted under 35 U.S.C. 154(b) by 186 days.

(21) Appl. No.: 15/024,093

(22) PCT Filed: Sep. 27, 2013

(86) PCT No.: PCT/EP2013/070184
§ 371 (c)(1),
(2) Date: Mar. 23, 2016

(87) PCT Pub. No.: WO2015/043647
PCT Pub. Date: Apr. 2, 2015

(65) Prior Publication Data
US 2016/0215455 A1 Jul. 28, 2016

(51) Int. Cl.
| | | |
|---|---|---|
| *D21H 17/37* | (2006.01) |
| *B44C 5/04* | (2006.01) |
| *D21H 27/28* | (2006.01) |
| *D21H 27/30* | (2006.01) |
| *D21H 17/24* | (2006.01) |
| *D21H 17/25* | (2006.01) |
| *D21H 17/28* | (2006.01) |
| *D21H 17/42* | (2006.01) |
| *D21H 17/43* | (2006.01) |
| *D21H 17/53* | (2006.01) |
| *D21H 17/67* | (2006.01) |
| *D21H 19/44* | (2006.01) |
| *D21H 19/64* | (2006.01) |
| *B32B 21/06* | (2006.01) |
| *B32B 29/00* | (2006.01) |
| *C08F 120/06* | (2006.01) |
| *B32B 37/06* | (2006.01) |
| *B32B 37/10* | (2006.01) |
| *D21H 17/68* | (2006.01) |
| *D21H 23/22* | (2006.01) |
| *C08L 33/02* | (2006.01) |

(52) U.S. Cl.
CPC .............. *D21H 17/37* (2013.01); *B32B 21/06* (2013.01); *B32B 29/002* (2013.01); *B32B 37/06* (2013.01); *B32B 37/10* (2013.01); *B44C 5/0476* (2013.01); *C08F 120/06* (2013.01); *D21H 17/24* (2013.01); *D21H 17/25* (2013.01); *D21H 17/28* (2013.01); *D21H 17/42* (2013.01); *D21H 17/43* (2013.01); *D21H 17/53* (2013.01); *D21H 17/67* (2013.01); *D21H 17/675* (2013.01); *D21H 17/68* (2013.01); *D21H 19/44* (2013.01); *D21H 19/64* (2013.01); *D21H 23/22* (2013.01); *D21H 27/28* (2013.01); *D21H 27/30* (2013.01); *B32B 2260/028* (2013.01); *B32B 2260/046* (2013.01); *B32B 2305/72* (2013.01); *B32B 2471/00* (2013.01); *B32B 2479/00* (2013.01); *C08L 33/02* (2013.01)

(58) Field of Classification Search
CPC ....... B32B 21/06; B32B 29/002; B32B 37/06; B32B 37/10; B44C 5/0476; C08F 120/06
USPC ...................................................... 428/537.5
See application file for complete search history.

(56) References Cited

U.S. PATENT DOCUMENTS

| | | | | |
|---|---|---|---|---|
| 5,362,557 A | * | 11/1994 | Albrinck ................. | B32B 27/04 428/323 |
| 5,558,906 A | * | 9/1996 | Albrinck ................. | B32B 27/04 427/180 |
| 6,835,421 B1 | * | 12/2004 | Dohring ................ | B44C 5/0476 427/202 |
| 7,569,270 B2 | * | 8/2009 | Dohring ................ | B44C 5/0476 427/202 |
| 2010/0086770 A1 | | 4/2010 | Roesch | |
| 2011/0171460 A1 | | 7/2011 | Endesfelder et al. | |

FOREIGN PATENT DOCUMENTS

| | | |
|---|---|---|
| CN | 101626886 A | 1/2010 |
| DE | 691 07 370 T2 | 6/1995 |
| EP | 0 136 577 A2 | 4/1985 |

(Continued)

OTHER PUBLICATIONS

International Search Report and Written Opinion for corresponding patent application No. PCT/EP2013/070184 dated Jun. 25, 2014.
International Preliminary Report on Patentability for corresponding patent application No. PCT/EP2013/070184 dated Dec. 7, 2015.
Office Action for corresponding Chinese Patent Application No. 201380079880.X dated Oct. 20, 2017.

*Primary Examiner* — Leszek Kiliman
(74) *Attorney, Agent, or Firm* — Renner, Otto, Boisselle & Sklar, LLP

(57) ABSTRACT

The present invention relates to a dispersion for manufacturing of resin-impregnated papers, as can be used for the manufacturing of abrasion-resistant (micro scratch-resistant) surfaces, such as laminate floors, furniture surfaces or laminates (CPL, HPL). The invention relates also to a corresponding method for manufacturing of such surfaces as well as to corresponding manufactured products. Thereby, the dispersion contains for example (in weight percent) 30 to 75% water and 10 to 65% corundum particles with a particle size of F400 to F2000 as well as further additives in small quantity. This dispersion can be introduced into a liquid amino resin mixture to impregnate paper.

17 Claims, 1 Drawing Sheet

(56) References Cited

FOREIGN PATENT DOCUMENTS

| EP | 0 472 036 B1 | | 2/1995 |
|----|---|---|---|
| EP | 0 732 449 A1 | | 9/1996 |
| EP | 0732449 | * | 9/1996 |
| EP | 1 186 708 A1 | | 3/2002 |
| EP | 1186708 | * | 3/2002 |
| EP | 2 397 448 A1 | | 12/2011 |
| EP | 2 288 500 B1 | | 4/2013 |
| WO | 02/22953 A1 | | 3/2002 |
| WO | 2007/048731 A1 | | 5/2007 |

* cited by examiner

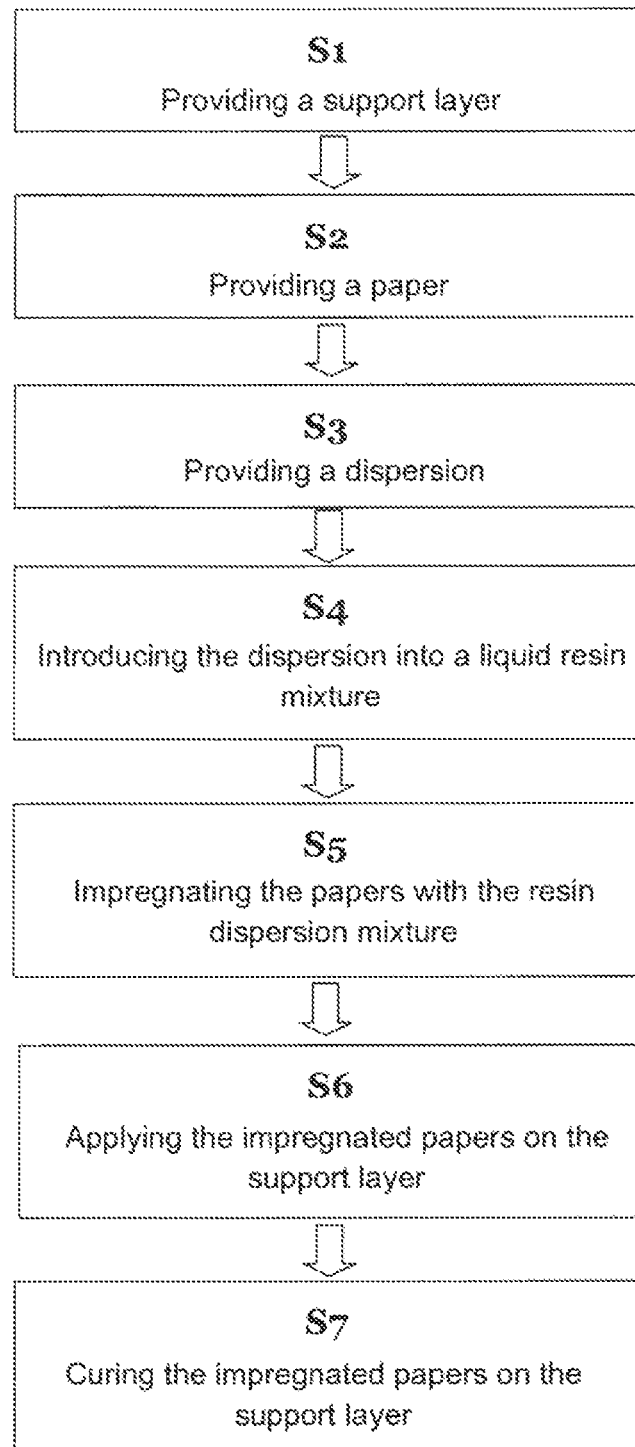

DISPERSION FOR PRODUCING ABRASION-RESISTANT SURFACES

1. FIELD OF THE INVENTION

The present invention relates to a dispersion for manufacturing of resin-impregnated papers, as can be used for the manufacturing of abrasion-resistant (micro scratch-resistant) surfaces, such as laminate floors, furniture surfaces or laminates (CPL, HPL). The invention relates also to a corresponding method for manufacturing of such surfaces, as well as corresponding manufactured products.

2. BACKGROUND OF THE INVENTION

A variety of materials with abrasion-resistant surfaces is known from the prior art which are used as floor coverings or furniture surfaces. In this context laminate floors are particularly widespread which are relatively inexpensive and have excellent abrasion-resistant surfaces. Such laminate floors are usually based on a support plate or a support layer made of MDF- or HDF-material, on top of which one or more resin-impregnated paper layers are applied. The used resins are typically amino resins which are cured by pressing under the influence of heat and pressure. The resins or the impregnated papers are also often provided with abrasion-resistant particles, to increase the abrasion-resistance of the surface. Therefore, abrasion-resistant particles can be added to the resin prior to impregnation of the paper in a particle size of typically 40 to 140 µm and/or the particles are added to the still undried paper after the impregnation, thus before it is cured.

In EP O 732 449 A1, hereto, a special resin mixture is proposed which consists of a mixture of water, melamine resin, alpha cellulose in a predetermined fiber length and amount and corundum powder with a particle size of about 20 to 50 µm. Thereby, the corundum powder in the mixture should be finely dispersed and should be fixed to the fibers of alpha cellulose. Hereby, the mineral remains homogeneous in dispersion and the cellulose fibers ensure that the resin contained in the mixture no longer penetrates into the decorative sheet, but rather remains mainly on the surface and forms a relatively thick resin layer.

EP 2 288 500 B1 also discloses a laminate and a method for its manufacturing. The underlying problem of this document is that the added abrasion-resistant particles induce a loss of gloss and transparency of the laminate on the one hand and the press plates used for the manufacturing of the laminate damage or wear on the other hand. As a solution, this publication proposes to impregnate a paper with an aminoplast resin and to dry in a first step. Then, a dispersion consisting of surface-modified silica nanoparticles and a dispersing agent should be applied on this already impregnated paper. Thereby, the dispersing agent should consist of for example water or polar solvents. The usage of the surface-modified silica nanoparticles should lead to improved compatibility of the nanoparticles with the aminoplast resin matrix, resulting in a homogeneous distribution of the nanoparticles in the resin matrix and a uniform distribution upon the surface of the already impregnated paper. Thereby, a significantly improved resistance of the so generated surface should result from the improved embedding of the nanoparticles. Such a generated laminate should be suitable for the use as floor covering, tabletop or generally in the manufacturing of furniture for the manufacturing of other furniture. This way, micro scratch-resistant surfaces can be generated, however, the procedure is very expensive.

The manufacturing and application of powder materials on the glass basis is known from EP 2 397 448 A1 which are particularly suitable for use in melamine resins and the like for coating floor panels. For example, finely grated borosilicate glass can be processed well with melamine resin, whereas finely ground sodium lime glass as an additive to the melamine resin is less suitable, since hereby no homogenous, continuous film can be formed. In this document, the problem is therefore already mentioned that not every additive is suitable for the processing with a melamine resin or the like, but on the contrary, it is extremely difficult to find suitable materials.

An amino resin is known from WO 2007/048731 A1 which is provided with anorganic nanoparticles, such as for example silicon oxide particles in size from 2 to 500 nm. Thereby, the nanoparticles serve to make surfaces, which are provided with the amino resin, more abrasion-resistant.

Decorative laminates are described in EP 0 136 577 A2 which comprise resin-impregnated decorative papers which are applied on a support plate of e.g. fiber plates or the like. Nanoparticles are added in a size of 5 to 100 nm to this to increase the scratch-resistance of the surface.

While the methods known from the prior art can indeed lead to satisfactory abrasion values, so, the generated surfaces anyway comprise an unsatisfactory abrasion-resistance (also referred to as scratch-resistance or micro scratch-resistance) and/or the manufacturing of the surfaces is complex or expensive. The person skilled in the art understands the abrasion-resistance or micro scratch-resistance as the resistance of surfaces against scratches with very low depth, which often can already be generated by cleaning operations with soft materials per se. Such micro-scratches typically have a depth of no more than about 6 µm and, are in particular an optical impairment of the surfaces and are not so much an impairment of the functional properties. Therefore, a surface can comprise a good abrasion-resistance—and thus withstand the typical stresses well, leading to deep scratches (also in the order of fractions of millimeters)—and can still be sensitive to micro-scratches. In other words, a surface, which is optimized on good abrasion-resistance, is regularly not necessarily also in view of scratch-resistance optimal.

There have been repeated attempts for nanoparticle modifications for amino resins which have not been established yet for reasons of cost and for reasons of processing difficulties. In contrast to the amino resins, nanoparticle modifications can be made much easier in acrylate resins which lead to an improved scratch-resistance. It meets today to the prior art to achieve very high micro scratch-resistance for acrylate-coated surfaces. As an example, the X-add® KR.9006 of the Nano-X GmbH is mentioned. If the amino resin surfaces should be competitive against the acrylate resin surfaces in the future, economically and technically sustainable developments are required. Therefore, the objective of the present invention is to provide a special dispersion for manufacturing of a resin-impregnated paper with which the abrasion-resistant particles can be suitably supplied, so that herewith generated surfaces have an improved micro scratch-resistance. Thereby, it is in particular an objective of the invention to provide a dispersion which can readily be processed together with the resins usually used and in which very fine abrasion-resistant particles with an average size of only about 18 to 1 µm (according to the FEPA-Standard 42-2 (2006) for the products F400 to F2000) can be very homogeneously dispersed. It is also an objective of the invention to provide a method for the manufacturing of laminate materials which is suitable for the manufacturing of laminate floors, furniture surfaces etc. as well as such a product, with which relatively fine corundum particles are used and which comprises an excellent scratch-resistance.

These objectives are achieved with a dispersion according to claim 1, a method for manufacturing of a laminate material according to claim 7 as well as a laminate material according to claim 12.

3. DETAILED DESCRIPTION OF THE INVENTION

According to the present invention, a dispersion for the manufacturing of a resin-impregnated paper is provided which preferably comprises the following so components in weight percent: 20 to 75% water; 10 to 65% corundum particles with a particle size of F400 to F2000; 0.5 to 15% anionic dispersing agents, or 0.5 to 15% of a mixture of anionic dispersing agents and nonionic tensides; and 0.01 to 2% thickening agents.

Preferably, the dispersion comprises the following components in weight percent: 30 to 75% water; 10 to 65% corundum particles with a particle size of F400 to F2000 (according to FEPA-Standard); 0.05 to 5% anionic dispersing agents and/or 0.1 to 5% nonionic tensides; 0.05 to 5% of sodium polyacrylate and 0.01 to 2% thickening agents.

It has been shown that in such a dispersion also relatively fine corundum particles with a particle size of only F400 to F2000 (corresponding to a particle size of about 18 to 1 μm) can be very homogeneously dispersed and also can remain in dispersion for a long time, i.e. do not settle and do not form agglomerates. It is almost more important that this dispersion cooperates very well with the usual resins, such as particular amino resins, without leading to those problems which are described in the prior art, such as a sedimentation of corundum particles, a clouding of the resin or an insufficient film formation and the like. The dispersion according to the invention allows for the use of corundum particles with the specified small particle size, surprisingly leading to, if properly used, surfaces with very good micro scratch-resistance (abrasion-resistance) even at very low additional quantities.

Usually particles with larger diameter are desirable, if particularly high abrasion values should be achieved. However, large particles do not lead to improved scratch-resistance values, i.e. while the large particles protect well against large and heavy mechanical impacts, they may not prevent the formation of micro-scratches (up to about 6 μm deep) which can already be formed for example by cleaning operations with a cloth.

In general, preferably, the dispersion is built up (in weight percent) as follows or comprises the following rates: 35 to 70% water; 20 to 60% corundum particles with a particle size of F400 to F2000; 0.06 to 4% anionic dispersing agents; 0.06 to 4% sodium polyacrylate; 0.15 to 4% nonionic tensides and 0.02 to 2% thickening agents.

More preferably, the dispersion is structured as follows or comprises the following rates: 40 to 68% water; 30 to 58% corundum particles with a particle size of F400 to F2000; 0.07 to 3.5% anionic dispersing agents; 0.07 to 3.5% sodium polyacrylate; 0.2 to 3.5% nonionic tensides and 0.03 to 2% thickening agents.

The thickening agents are preferably used as sheet silicate and/or polysaccharides.

It has been shown that a particularly good embedding of the fine particles in a later resin matrix is possible, if the used corundum particles are silanized.

In general, the inventive dispersion even allows for use of corundum particles with a particle size of only F500 to F2000 and most preferably, the particle size ranges from F600 to F1000. The terms F400, F600, etc. are known to the person skilled in the art for determining the particle size from the FEPA-Standard 42-2 (2006). The present invention also relates to a method for manufacturing of a laminate material, which is suitable for the manufacturing of furniture and floor panels, which comprises the following steps of:

Starting point for the manufacturing method is a dispersion, as described above. This dispersion is introduced in an aqueous, i.e. liquid resin mixture (preferably amino resin mixture), wherein preferably 0.5 to 7 kg of dispersion are introduced to 100 kg of resin (relating to the solid content in the liquid resin mixture), more preferably 0.5 to 5 kg, and most preferably 0.6 to 3 kg. The solid content of the resin is used as basis for the calculation in this case. Such resins are commercially provided in aqueous solution, wherein the solid content generally varies between 50-60%. The solid content is provided by the providers of such resin mixtures or may be determined in the manner known to the person skilled in the art. It is exemplary referred to the EN 827 (2005.7.6.1), in which the determination of the solid content of binding agents is regulated. After stirring and a homogeneous distribution of the dispersion in the resin mixture, hereby, a paper is impregnated, for example, a roller application. The paper, however, can also be passed through a bath of the resin mixture. Then, the so impregnated paper is applied e.g. on a support layer made of wood or a wood material and is then cured on this support layer under the influence of heat and pressure. Preferably, thereby, the resin is an amino resin, namely in particular a melamine resin and/or urea resin, as are conventionally used in the manufacturing of laminate floors. Further, additional manufacturing steps can be carried out of course.

For example, phenol resin-impregnated kraft papers are combined in the laminate manufacture, wherein the number and grammage depends on the desired final material strength. On these core layers of kraft paper an amino resin-impregnated decorative paper is applied and an overlay is used as top layer. This overlay is impregnated, for example with the dispersion containing the resin mixture. If no overlay should be used also the decorative paper can be impregnated with the dispersion containing the resin mixture. Then, the composite is pressed in a manner known to the person skilled in the art under the influence of heat and pressure.

It has been shown that a relatively high shear rate is advantageous for the manufacturing of the dispersion according to the invention during the stirring of the dispersion, namely in particular when the dispersion is stirred, prior to introducing into the resin mixture for at least 10 minutes at a shear rate of at least 10 m/sec, preferably at least 12 m/sec, and most preferably 15 m/sec.

Laminate materials can be manufactured with the help of the dispersion according to the invention or the manufacturing method according to the invention, which comprise new and not achievable properties to date. Laminates or Laminate materials that are manufactured with the present dispersion or by means of the present method, namely comprise excellent scratch-resistance, although they are only provided with very fine abrasion-resistant particles with a particle size from F400 to F2000 and they are also preferably applied only in an extremely small mass, namely from 0.3 to 3 $g/m^2$, preferably from 0.3 to 2 $g/m^2$, even more preferably from 0.4 to 1.5 $g/m^2$, and most preferably from 0.4 to 1 $g/m^2$.

Accordingly, the invention also relates to laminate materials comprising a support layer of wood, a wood material or a laminate, wherein a main face of the support layer in the preferred top layer comprises an amino resin-impregnated paper, which comprises corundum particles with a particle size from F400 to F2000. Such a pressed surface comprises a micro scratch-resistance according to EN16094: 2012-04 of at least MSR-A2, preferably MSR-A1 and also comprises a resistance class of at least MSR-B2 and preferably even MSR-B1. The laminate is obtainable by impregnating of the paper with the above-described method, namely with a dispersion according to the invention, which was introduced into a liquid resin mixture in a defined ratio. If the laminate material according to the invention is used for example as a floor covering, or for the manufacturing of a floor covering, so additional high abrasion values can be achieved by additionally applying e.g. corundum with a particle size of 40-140 μm according to the known methods.

The support plate or support layer preferably consists of a plate of MDF or HDF with a plate thickness of 4-40 mm and the used resin is in turn preferably an amino resin, in particular a melamine resin and/or urea resin.

In the following the invention will be described with reference to several exemplary embodiments in more detail:

Example 1: Manufacturing of a Micro Corundum Dispersion 40 kg of water, 4 kg of a low ethoxylated fatty alcohol (e.g. Lutensol TO3 from BASF), 4 kg of sodium dioctyl-sulfosuccinate (Lutensit A-BO from BASF), 4 kg of sodium polyacrylate (e.g. Lopon LF; BK Giulini) are submitted. This mixture is stirred for 5 min at room temperature. Subsequently, 47.5 kg of corundum with a particle size of F1000 are added while stirring. Thereafter, 0.5 kg sheet silicate (corresponding to the thickening agents) (Betone EW; Elementis) are added. It is now dispersed for 10 minutes at a shear rate of 15 m/min. Instead of the sheet silicate, equal rates of a polysaccharide (gum arabic or carob flour) may be added. Also combinations of gum arabic and Bentone EW can be submitted.

Example 2: Manufacturing of an Impregnating Resin Mixture

The micro corundum dispersion from example 1 as well as 90 kg of a commercially available melamine formaldehyde impregnating resin with a solid content of 60% are used as starting point. This is treated with 0.37 kg of a suitable melamine resin curing agent, 0.21 kg of a wetting agent, 0.45 kg of a releasing agent and 8.15 kg water. The clouding time should range from 5:00 to 5:30 min. While stirring, 0.82 kg of micro corundum dispersion described in example 1 are added (this therefore corresponds to 1.52 kg of dispersion per 100 kg of solid content of the impregnating resin). The so manufactured resin is put into an impregnating bath of a commercially available impregnating channel.

Example 3: Manufacturing of a Laminate Floor with a Micro Scratch-Resistant Surface A corundum containing overlay paper with a grammage of 60 g/m$^2$ is impregnated with the resin mixture of example 2. Therefore, a resin application of 280% is set, i.e. the grammage ("Flächenmasse") of the impregnator is 228 g/m$^2$. The person skilled in the art understands the impregnator here as the impregnated paper after drying but before curing of the resin. Thus, the measurement takes place after the impregnated paper was dried. This has practical reasons, since a dryer follows directly to the impregnating bath or the impregnating channel in industrial plants, so that a sampling for measuring the resin content is usually possible or meaningful after drying. Then, the taken sample is cut into a sheet of 100 cm$^2$ and weighted. The difference between the weight of the raw paper (here the 60 g/m$^2$) and the weighted value roughly corresponds to the applied amount of resin (any differences in the unavoidable residual moisture after drying are very low and negligible). In the present example the impregnator contains about 168 g/m$^2$ resin application 280% of 60 g/m$^2$). The impregnator is then further processed as follows: On the lower side of a HDF-support plate with a thickness of 8 mm, a conventionally impregnated counter-acting paper is provided and on the upper side of the support plate, a conventionally impregnated decorative paper. Then, the impregnated overlay is arranged on this decorative paper as the uppermost layer. This sandwich composite is entered into a short-cycle press and pressed for 15 seconds at 185° C. After cooling and depositing the thus obtained coated laminate material plate, dividing and the known profile cutting into floor panels takes place. A floor panel thus produced reaches the abrasion class AC5 according to EN 13329 and the highest micro scratch-resistance level MSR-A1 as well as MSR-B1 according to EN 16094.

Example 4: Manufacturing of a Laminate with a Micro Scratch-Resistant Surface An overlay with a grammage of 25 g/m$^2$ is impregnated with the resin mixture, as described in example 2. The resin application is set at 300%, so that the grammage of the impregnator is about 100 g/m$^2$. A double belt press (such as available from the company Hymmen) is then assembled from bottom to top as follows: Parchment Paper 50 g/m$^2$, two phenolic resin impregnated core layers, each having a grammage of 278 g/m$^2$, a melamine resin-impregnated decorative paper and the overlay, as described. This sandwich composite is passed through the double belt press at a surface temperature of 180° C. and a speed of 12 m/min. The thus obtained laminate material or the laminate is ground on the back and glued onto a 38 mm thick chipboard. In this way, a kitchen worktop with the highest micro scratch-resistance classification MSR-A1 and MSR-B1 according to EN 16094 is obtained. In a comparative test with a conventional melamine resin surface only the classification MSR-A3 and MSR-B4 is obtained.

Example 5: Manufacturing of a Directly Coated Chipboard for Furniture Surfaces A decorative paper with an oak reproduction and a grammage of 70 g/m$^2$ is impregnated with the impregnating resin mixture from example 2. The resin application is 135%, i.e. the grammage of about 164.5 g/m$^2$ for the impregnator (i.e. 70 g/m$^2$ Paper Plus 94.5 g/m$^2$ resin application). A chipboard with a thickness of 18 mm is combined on both sides with the decorative impregnator and pressed in a short-cycle press for 18 s at 185° C. The thus obtained laminate material has a surface with the highest micro scratch-resistance classification MSR-A1 and MSR-B1.

These embodiments show that one can completely surprisingly achieve the highest micro scratch-resistance classification with the described procedure with very small additives of micro corundum. In example 5 the micro corundum content is for example 0.7 g/m$^2$. Thereby, the process is robust, there is no separation of the product ("Absatzscheinungen") in the impregnating bath, even over longer production time periods. Another advantage of the extremely low concentration of micro corundum is of course also the fact that further processing operations will not be affected disadvantageously and that the surface remains highly transparent and is not clouded by the additives.

DESCRIPTION OF THE PREFERRED EMBODIMENTS

In the following the invention will be explained in more detail with reference to the FIGURES, wherein FIG. 1 is a diagram showing a method according to the invention.

In FIG. 1, a method according to the invention is illustrated exemplary. The skilled person will appreciate that the steps S1 to S7 of the illustrated method not necessarily have to take place in the order given, but can take place in any logical order. In particular, it is for example irrelevant whether the steps S1 and S2 take place before S3 and S4. In a first step S1 of the exemplary method a carrier layer of MDF is provided, such as an about 6 mm thick MDF plate. In step S2, a paper is provided, such as a decorative paper, i.e. printed paper sheet with a decorative pattern. Then, in step S3 a dispersion according to the invention is then prepared according to the above indications and is introduced in step S4 into a liquid resin mixture of melamine resin and is introduced into the usual additives and stirred. In step S5, this resin-dispersion mixture is fed to the paper, and this is impregnated with the mixture. The so impregnated paper is intermediate-dried and then applied on the support layer of MDF. Then, the so impregnated paper is cured on the support layer under the influence of heat and pressure, so that a laminate material is formed, that comprises an excellent micro scratch-resistance and can be further processed, for example to floor panels or furniture plates.

The invention claimed is:

1. A dispersion for manufacturing of a paper impregnated with a resin, comprising the following components in weight percent:
   30 to 75% water;
   10 to 65% corundum particles with a particle size of F400 to F2000;
   0.05 to 5% anionic dispersing agents;
   0.05 to 5% of sodium polyacrylate;
   0.1 to 5% nonionic tensides; and
   0.01 to 2% thickening agents.

2. The dispersion according to claim 1, wherein the components are in weight percent as follows:
   35 to 70% water;
   20 to 60% corundum particle with a particle size of F400 to F2000; 0.06 to 4% anionic dispersing agents;
   0.06 to 4% sodium polyacrylate;
   0.15 to 4% nonionic tensides;
   0.02 to 2% thickening agents.

3. The dispersion according to claim 2, wherein the components are in weight percent as follows:
   40-68% water;
   30-58% corundum particles with a particle size of F400 to F2000;
   0.07 to 3.5% anionic dispersing agents;
   0.07 to 3.5% sodium polyacrylate;
   0.2 to 3.5% nonionic tensides;
   0.03 to 2% thickening agents.

4. The dispersion according to claim 1, wherein the thickening agents comprise a sheet silicate or a polysaccharide.

5. The dispersion according to claim 1, wherein the corundum particles are silanized.

6. The dispersion according to claim 1, wherein the corundum particles have a particle size from F500 to F2000.

7. A method for manufacturing of a laminate material, comprising the steps of:
   a) providing a support layer;
   b) providing a paper;
   c) providing a dispersion according to claim 1;
   d) introducing the dispersion into a liquid resin mixture, wherein applied on 100 kg resin 0.5 to 7 kg dispersion are introduced on the solid content; thereafter
   e) impregnating the paper with the resin dispersion mixture;
   f) applying the impregnated paper on the support layer; and
   g) curing the impregnated paper on the support layer.

8. The method for manufacturing of a laminate according to claim 7, wherein the resin is an amino resin.

9. The method for manufacturing of a laminate material according to claim 7, wherein the curing of the impregnated paper is carried out by heat and/or pressure.

10. The method for manufacturing of a laminate material according to claim 7, wherein the dispersion is mixed prior to the step d) for at least 10 minutes at a shear rate of at least 10 m/sec.

11. The method for manufacturing of a laminate material according to claim 7, wherein the support layer consists of wood, a wooden material or a laminate.

12. A laminate material, comprising a support layer of wood, a wooden material or a laminate,
   wherein at least on one main side of the support layer a resin-impregnated paper is provided, which comprises corundum particles with a particle size from F400 to F2000; in which
   the laminate comprises a micro scratch-resistance according to EN 16094: 2012-04 of at least MSR-A2, preferably MSR-A1, and a resistance class of at least MSR-B2; and which laminate was obtained by impregnating of the paper with the following method:
   a) providing a dispersion according to claim 1;
   b) introducing the dispersion into a liquid resin mixture, wherein applied on 100 kg resin 0.5 to 6 kg dispersion are introduced on the solid content; and thereafter
   c) impregnating the paper with the resin dispersion mixture.

13. The laminate material according to claim 12, wherein the resin is an amino resin.

14. The laminate material according to claim 12, wherein the support layer is a plate of MDF or HDF with a plate thickness of 4 to 40 mm.

15. The laminate material according to claim 12, wherein the resin-impregnated paper comprises a corundum content of 0.3 to 3 g/m$^2$.

16. The method for manufacturing of a laminate material according to claim 7, wherein the dispersion is mixed prior to the step d) for at least 15 m/sec.

17. The dispersion according to claim 1, wherein the corundum particles have a particle size from F600 to F1000.

* * * * *